United States Patent
Peng

(10) Patent No.: US 10,242,702 B1
(45) Date of Patent: Mar. 26, 2019

(54) NEAR-FIELD TRANSDUCER WITH STACKED FEATURES THAT REDUCE EMISSION OF POLARIZATION-ROTATED LIGHT

(71) Applicant: Seagate Technology LLC, Cupertino, CA (US)

(72) Inventor: Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/426,291

(22) Filed: Feb. 7, 2017

Related U.S. Application Data

(60) Provisional application No. 62/301,026, filed on Feb. 29, 2016.

(51) Int. Cl.
| | |
|---|---|
| *G11B 5/00* | (2006.01) |
| *G11B 5/48* | (2006.01) |
| *G11B 5/187* | (2006.01) |
| *G11B 5/60* | (2006.01) |
| *G11B 5/012* | (2006.01) |

(52) U.S. Cl.
CPC ............ *G11B 5/4866* (2013.01); *G11B 5/187* (2013.01); *G11B 5/6088* (2013.01); *G11B 5/012* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,514,673 | B1 | 8/2013 | Zhao et al. |
| 9,019,803 | B1 | 4/2015 | Jin et al. |
| 2010/0165802 | A1 | 7/2010 | Stipe |
| 2013/0330573 | A1* | 12/2013 | Zhao .................... G11B 5/3133 428/814 |

* cited by examiner

*Primary Examiner* — Brian M Butcher
(74) *Attorney, Agent, or Firm* — Hollingsworth Davis, LLC

(57) ABSTRACT

A recording head has a near-field transducer overlapping a core near a media-facing surface of the recording head. The near-field transducer has an enlarged portion formed of a plasmonic material and a peg extending from the enlarged portion. The enlarged portion includes a stacked feature that reduces the emission of a polarization rotated portion of light to a recording medium.

19 Claims, 10 Drawing Sheets

US 10,242,702 B1

NEAR-FIELD TRANSDUCER WITH STACKED FEATURES THAT REDUCE EMISSION OF POLARIZATION-ROTATED LIGHT

RELATED PATENT DOCUMENTS

This application claims the benefit of Provisional Patent Application Ser. No. 62/301,026 filed on Feb. 29, 2016, to which priority is claimed pursuant to 35 U.S.C. § 119(e), and which is incorporated herein by reference in its entirety.

SUMMARY

The present disclosure is directed to a near-field transducer with stacked features that reduce emission of polarization-rotated light. In one embodiment, a recording head includes a waveguide core that receives light from a light source and a near-field transducer that overlaps the core near a media-facing surface of the recording head. The near-field transducer has an enlarged portion formed of a plasmonic material and has a first thickness at an upper part of the enlarged portion. A peg extends from a lower part of the enlarged portion. The lower part of the enlarged portion includes a depression that results in a second thickness of the lower part, the second thickness less than the first thickness. The depression is filled by a dielectric material of low refractive index.

In another embodiment, a recording head includes a waveguide core that receives light from a light source and a near-field transducer that overlaps the core near a media-facing surface of the recording head. The near-field transducer has an enlarged portion formed of a plasmonic material and a peg extending from a lower edge of the enlarged portion. The peg is formed of a different material than the enlarged portion. A nano-rod is on one side of the enlarged portion. The nano-rod extends from a middle part of the enlarged portion to the lower edge of the enlarged portion.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

Light from a light source, such as an edge-emitting laser diode, is coupled into a HAMR waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The near-field transducer is designed to adapt the light delivery to the excited waveguide mode.

The present disclosure related to improving near-field transducer efficiency and reducing thermal background for waveguide NFT. The NFT is stacked for efficiency improvement and uses a bottom tapered core for thermal background reduction. The NFT may include an enlarged portion with a peg extending towards the recording medium, and the stacked features may include a depression in the enlarged portion and/or a nano-rod extending over the enlarged portion. The stacked portion reduces emission of a polarization-rotated component of the light to a recording medium, thereby improving NFT efficiency and reducing thermal background radiation.

Figure 1:
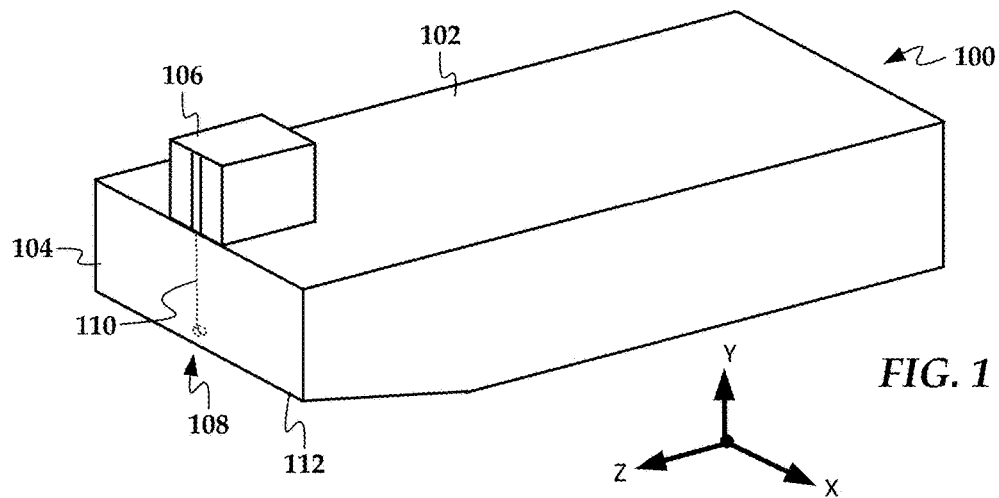
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
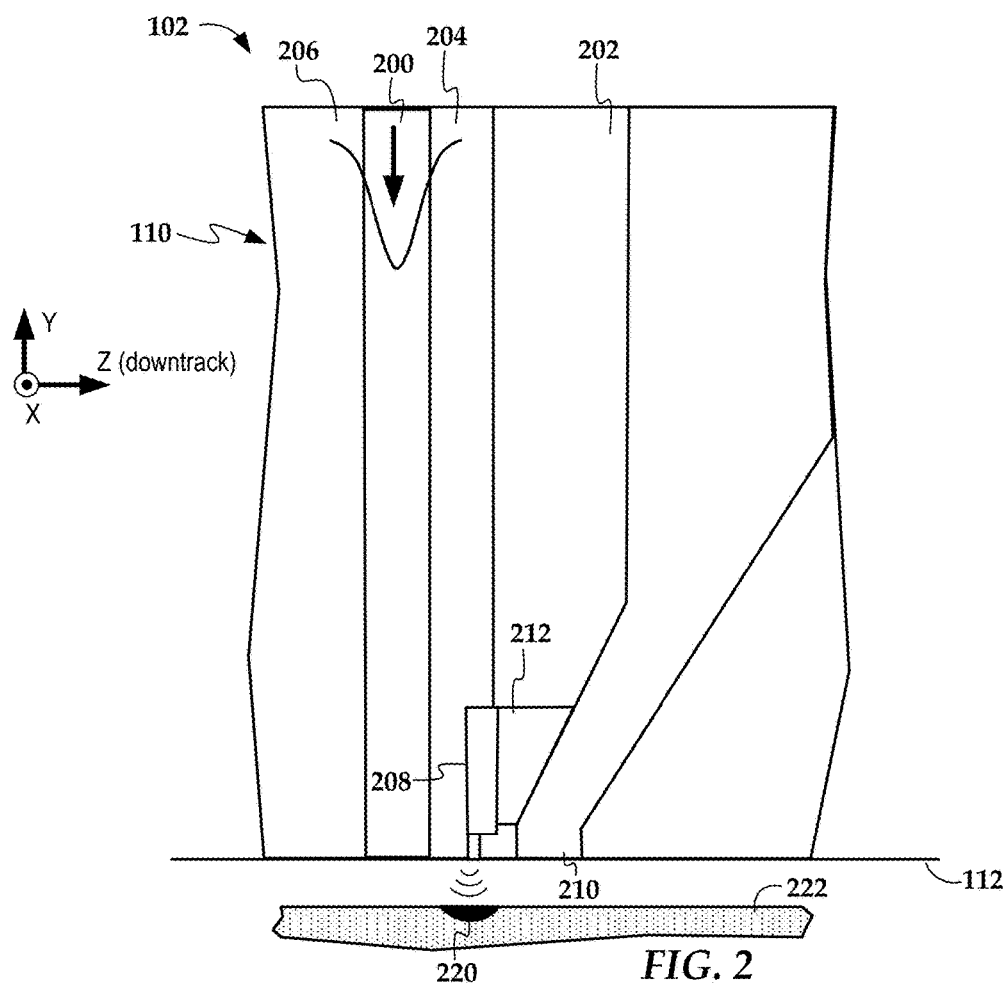
FIG. 2 is a cross-sectional view of a slider along a down-track plane according to according to an example embodiment.

In FIG. 2, a cross-sectional view shows details of a slider body 102 according to an example embodiment. The waveguide 110 includes a core 200, top cladding layer 202, side cladding layer 204, and bottom cladding 206. The waveguide core 200 is made of dielectric materials of high index of refraction, for instance, AlN (aluminum nitride), $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_2$ (barium titanate), GaP (gallium phosphide), $CuO_2$ (copper oxide), and Si (silicon).

An NFT 208 is placed at the side and top cladding layers 204, 202 of the waveguide and near the waveguide core 200. The cladding layers 202, 204, 206 are each formed of a dielectric cladding material having a refractive index lower than the core 200. The cladding material can be, for instance, $Al_2O_3$ (aluminum oxide), SiO and $SiO_2$ (silica). The core 200 delivers light to an NFT 208 that is located within the side and top cladding layers 204, 202 at the media-facing surface 112 near the waveguide core 200. A write pole 210 is located near the NFT 208. A heat sink 212 thermally couples the NFT 208 to the write pole 210. A magnetic coil (not shown) induces a magnetic field through the write pole 210 in response to an applied current. During recording, the NFT 208 forms a hotspot 220 within a recording layer of a moving recording medium 222. The write pole 210 sets a magnetic orientation in the hotspot 220, thereby writing data to the recording medium.

Figure 3:
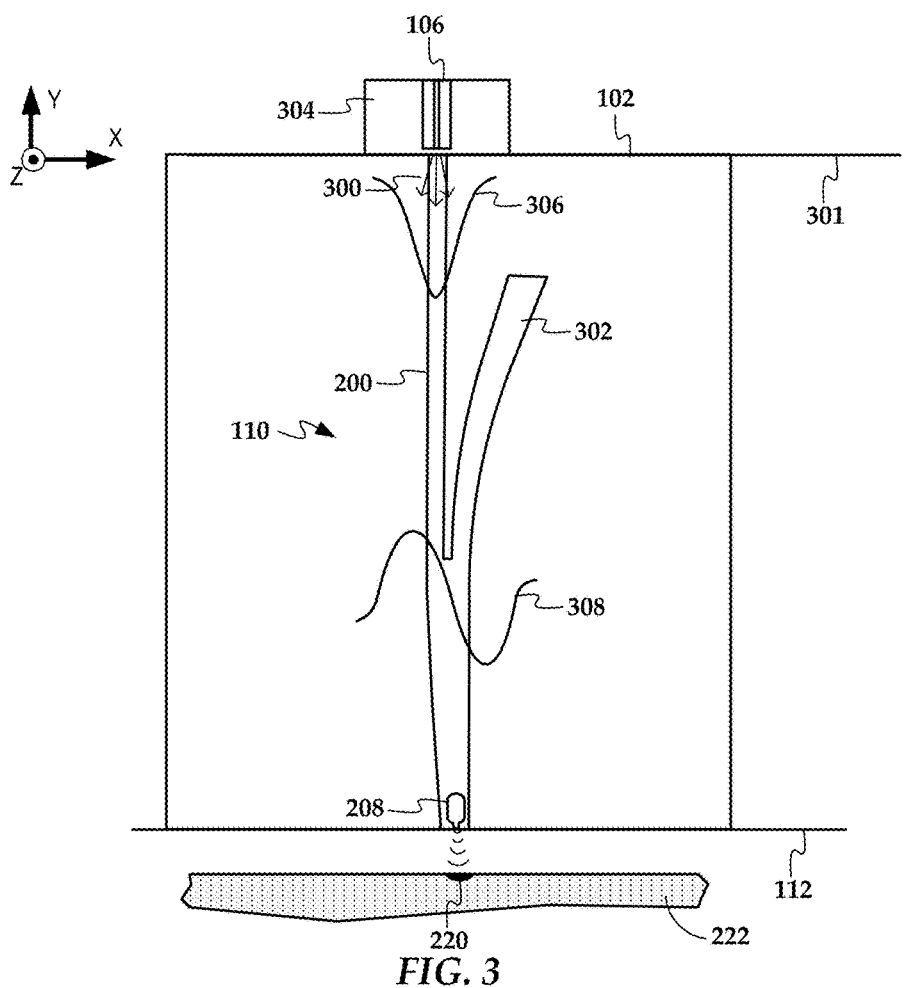
FIG. 3 is a wafer plane view of a slider according to an example embodiment.
Figure 4:
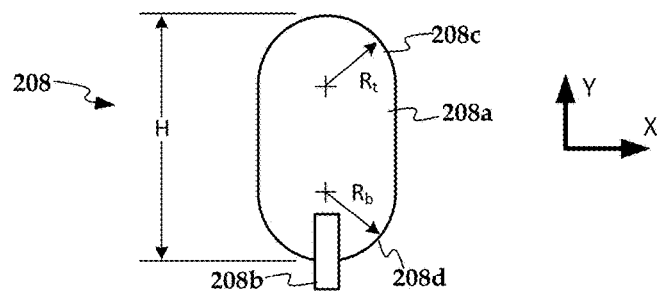
FIG. 4 is a close up view of the near-field transducer of FIG. 3.

In FIGS. 3 and 4, a wafer-plane view of the read/write head 100 shows the NFT 208 configured similarly to that described in U.S. Pat. No. 9,251,819. Light, emitting from a light source 106, is coupled into a three-dimensional single mode (TEoo) channel waveguide by a waveguide input coupler 300. The excited fundamental mode, TEoo, is converted into the first higher order mode, $TE_{10}$, with an assisted branch waveguide. A near-field transducer (NFT) with two curved ends and with a protruded peg.

A waveguide input coupler 300 at a top surface 301 of the slider body 102 couples light from the light source 106 to the waveguide 110, the light source 106 being mounted to the slider body 102 via a submount 304. The waveguide input coupler 300 receives light from the light source 106 and transfers the light to the core 200. As it extends away from the light source 106, the core 200 tapers from narrower to wider width (width in this case is the core's x-dimension).

An assisted branch waveguide 302 splits off of the main core 200 and converts the fundamental transverse electric waveguide mode ($TEo_{00}$), as indicated by mode profile 306, to a first-higher-order transverse electric mode ($TE_{10}$), as indicated by mode profile 308. The NFT 208 is designed for $TE_{10}$ coupling. As seen in the detail view of FIG. 4, the NFT 208 has an enlarged portion 208a from which protrudes a peg 208b. The enlarged portion 208a has two curved ends 208c-d that form respective upper and lower edges of the enlarged portion 208a. In other configurations, one or both of the ends 208c-d may be flattened. The enlarged portion 208a is formed of a plasmonic material, which has negative electric permittivity and low losses, such as Au (gold), Ag (silver), Cu (copper), etc.

For reliable operations of the NFT, the peg portion 208b may be made from a plasmonic material of high melting point that is different than that of the enlarged portion 208a, such as Rh (rhodium), Ir (iridium), Pd (palladium), and Pt (platinum). With these materials having greater losses, the NFT performance degrades. For example, these different-material pegs can reduce NFT efficiency and broaden the thermal spot in the recording layer.

The NFT 208 is excited by a transverse-electric, higher-order, mode ($TE_{10}$) propagating in a three-dimensional channel waveguide. The NFT 208 interacts with the incident light, e.g., the $TE_{10}$ waveguide mode, generating local surface plasmon along the circumference of enlarged portion 208a. Charges funnel into the peg 208b, resulting in a lightning effect. For efficient NFT excitation, the $TE_{10}$ waveguide cross-section dimension and shape of the peg 208b, including the end curvature/shape and NFT height as well as peg dimension can be optimized. A waveguide taper in the light delivery path is intended to connect the waveguide at the end of mode converter 302 to the waveguide where the NFT is placed.

Figure 5:
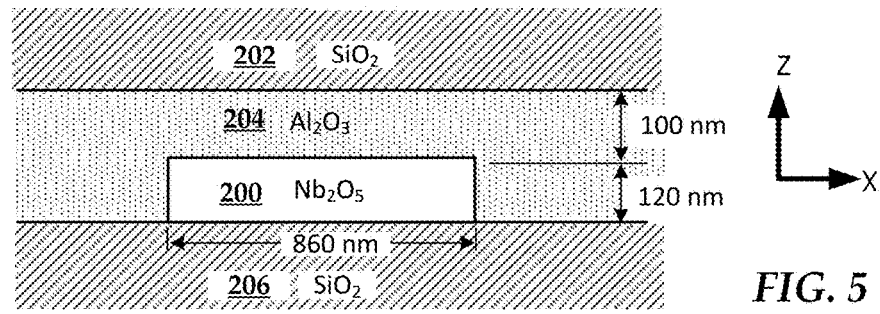
FIG. 5 is a cross-sectional view of the waveguide of FIG. 3.

As an example, consider a waveguide having a 120 nm thick (along z direction) niobium oxide ($Nb_2O_5$) core of refractive index n=2.29, surrounded with silica ($SiO_2$, n=1.46) bottom and top cladding layer and alumina ($Al_2O_3$, n=1.63) side cladding, see FIG. 5. The side cladding is t=220 nm thick. The core width for high NFT efficiency is 850 nm along the x-direction. The optimized NFT dimensions are: end radius of curvature $R_b$=$R_t$=200 nm, height H=600 nm. The peg dimension is 40-nm wide along the x-direction (cross-track), 30-nm thick along the z-direction (down-track), and 20-nm long away from the media-facing surface (along the y-direction). Along the z-direction, the NFT is placed 20-nm away from the core.

The magnetic pole is slanted at 26° from the y-direction and connected with the NFT by a heat-sink. Both NFT and NFT heat-sink use gold. The pole is 200-nm wide along the x-direction and wrapped with a Cr-heat sink. The total width (along the x-direction) of the pole plus Cr heat-sink is 600-nm. The heat-sink/pole is truncated at the far-end of the NFT. The NFT-pole distance at the media-facing surface is 20 nm. Light wavelength λ=830 nm.

For this example, a storage medium is placed underneath the media-facing surface. The medium includes a FePt layer (12.6 nm thick, complex refractive index n=2.55+j 2.72), a MgO layer (10 nm thick, n=1.70), and a heat-sink Cu layer (60 nm, n=0.26+j 5.29) on a glass substrate. The head-medium spacing is 8 nm, effective index n=1.21. The NFT efficiency, $CE_{50}$, is defined as the light absorption in the FePt layer in a foot print of 50 nm by 50 nm. For thermal modeling, light absorption inside the medium is the heat source for temperature rise. It is assumed that the specific heat C=4.19 $J/cm^3$/K, in-plane thermal conductivity K=0.05 J/cm/s/K, out-of-plane K=5 for the FePt layer; C=3.14 and K=0.052 for the MgO layer; C=3.49 and K=2 for the Cu heat-sink layer; C=1.64 and K=0.01 for the glass substrate.

Figure 6:
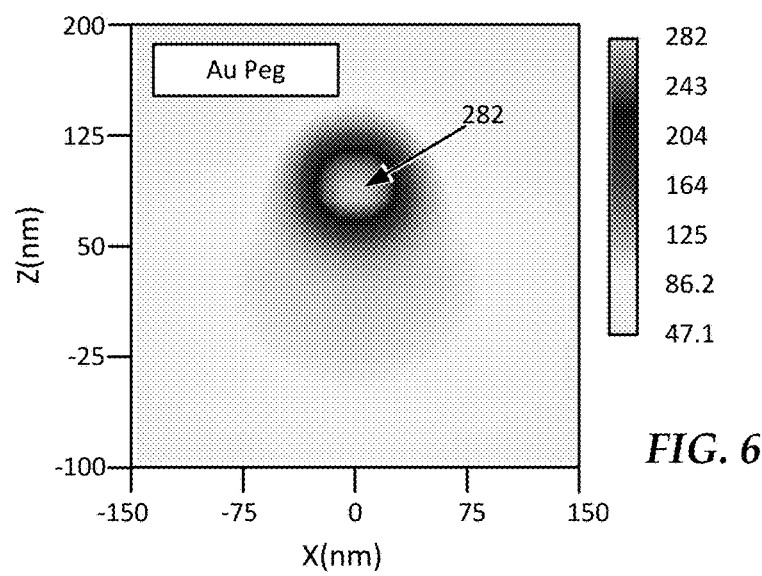
FIGS. 6 and 7 are thermal contour plots of recording media recording layer according to example embodiments.
Figure 7:
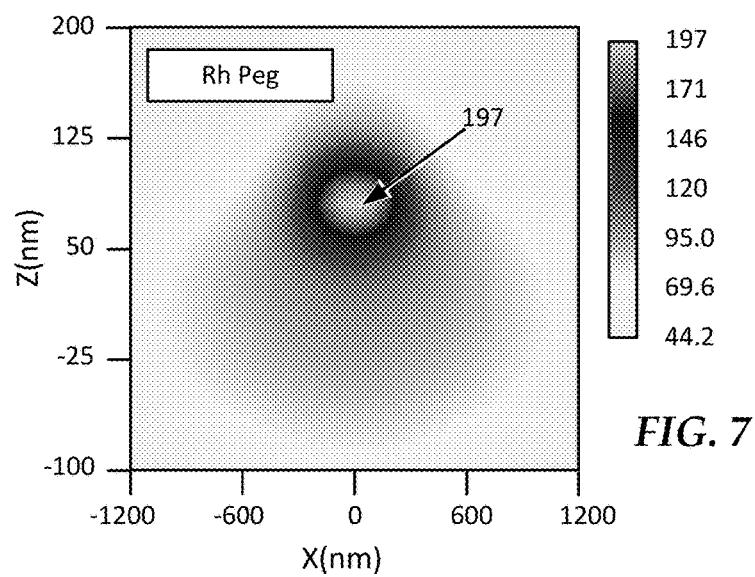

The temperature plots of FIGS. 6 and 7 show the profile of temperature rise at the middle plane of the FePt recording medium layer after illumination of 10 mW power and 10 ns. In FIG. 6, there is a hot spot, with full-width-at-half-maximum FWHM=87 nm along the cross-track direction (the x-direction in this view) and 84 nm down-track direction (the Z-direction) for gold peg. A thermal tail behind the hot spot is also visible, in particular for the case of using Rh peg. In the magnetic recording, a magnetic transition is determined by the front edge (the edge near to the magnetic pole) of the hot spot. This thermal tail, if weak, will usually not significantly impact the recording density. But it does impact the lapping tolerance of the peg. Moreover, if Rh is used as a peg material, the NFT efficiency drops by 45%, the thermal tail will appear much stronger, as shown in FIG. 7.

For the Rh peg, the thermal spot FWHM becomes 129 nm along down-track direction, an increase of as much as 53% from the Au peg, which will degrade the recording performance.

Figure 8:
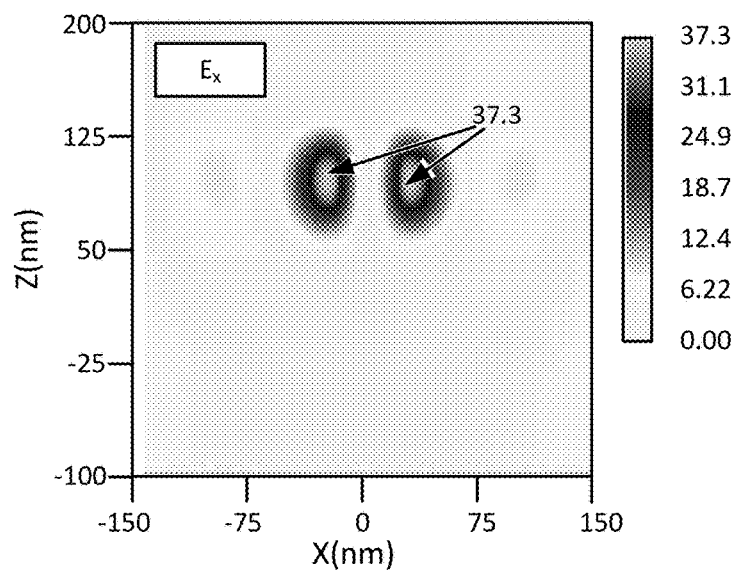
FIGS. 8, 9, and 10 are contour plots of electric field at the middle plane of the recording layer according to an example embodiment.
Figure 9:
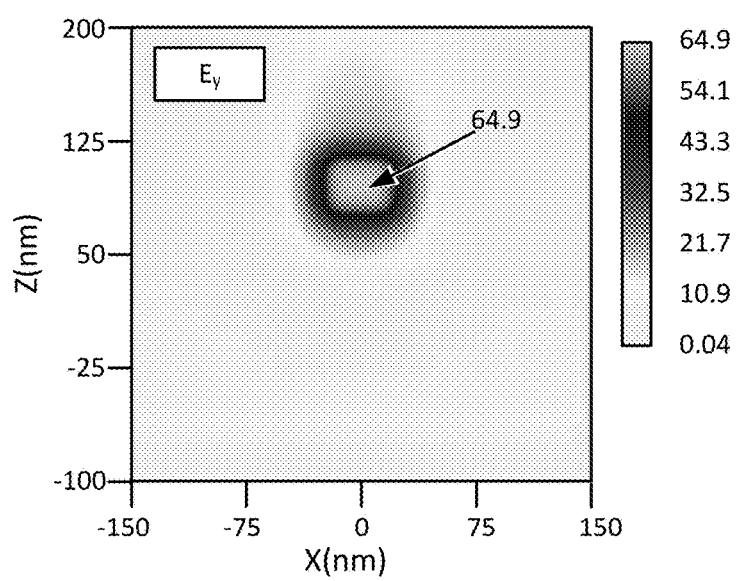
Figure 10:
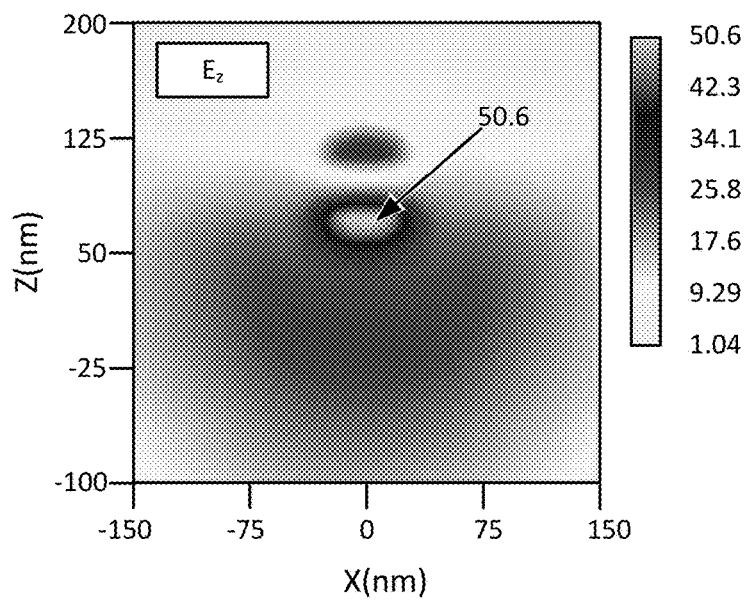

This thermal tail is not from the excitation, because the excitation field is nearly zero in this region. To figure out the cause of this thermal tail, the three vectorial components of the electric field at the middle plane of the recording layer are plotted in FIGS. 8-10. The dominant field component of the excitation is $E_x$, which has two lobes and does not present in the plotted x-range. Apparently the $E_z$ component, seen in FIG. 10, has a broad profile, resulting in the thermal tail.

Figure 11:
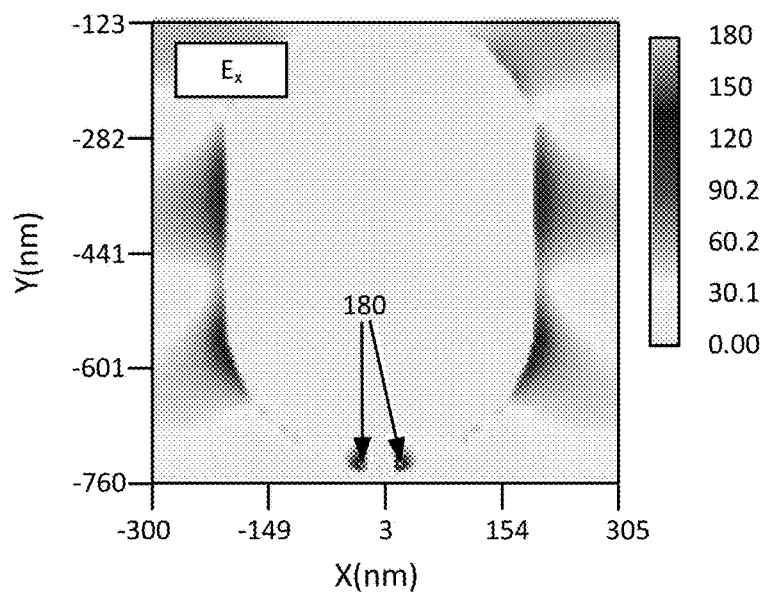
FIGS. 11 and 12 are contour plots of electric field around the outer contour of a near-field transducer according to an example embodiment.
Figure 12:
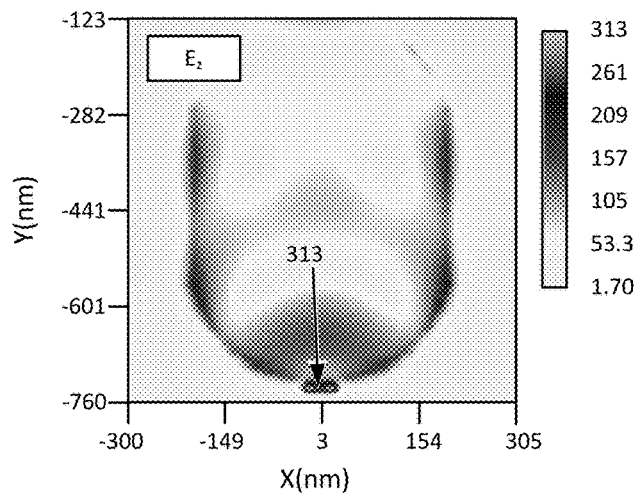

This $E_z$ component is generated by the coupling from the $TE_{10}$ mode to the surface plasmon of the NFT along the circumference of the NFT and extending to the bottom edge of the NFT facing to the core, as shown in FIGS. 11 and 12. This coupling induces polarization rotation from $TE_{10}$ to transverse magnetic ($TM_{00}$) mode. This $TM_{00}$ mode is hybrid, supported by the system of the NFT, the core, and the side cladding spacer between the core and NFT. The plots in FIGS. 11 and 12 display the evolution of the transverse electric field components ($E_x$, $E_z$) at the XY plane between the core and NFT. (This plane is 10-nm off the bottom of the NFT.) The $E_x$ component exhibits hexapole surface plasmon resonance, as designed. The $E_z$ component is strong near the bottom edge of the NFT and spreads at the region close to the peg portion. The stacked NFT described herein is intended to use this TM component for increasing NFT efficiency and also to mitigate it for reduction of thermal tail.

Figure 13:
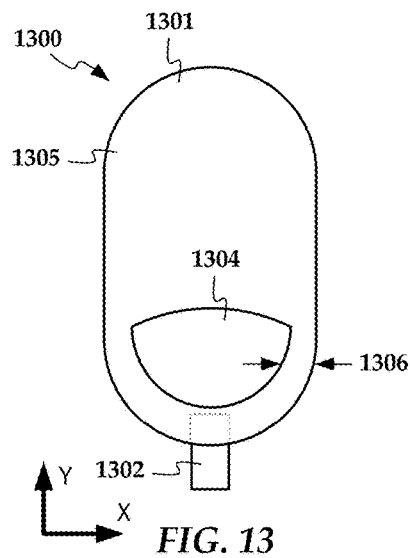
FIGS. 13 and 14 are diagrams showing a configuration of a near-field transducer according to a first embodiment.
Figure 14:
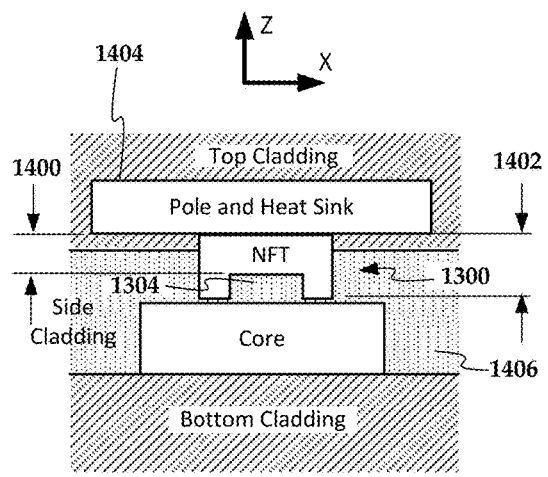

Diagrams in FIGS. 13 and 14 show configuration of an NFT 1300 according to a first embodiment. A portion of gold at a lower part 1304 of the enlarged portion 1301 of the NFT 1300 has a depression that results in a reduced thickness 1400 of the enlarged portion 1301. The reduced thickness 1400 is less than a nominal thickness 1402 of the rest of the enlarged portion 1301, e.g., upper part 1035 of the enlarged portion. The depression 1304 faces away from write pole 1404 and is filled by a dielectric material of low refractive index, such as the side cladding 1406. The depression 1304 may have a contour that corresponds to an outer contour of the lower part of the enlarged portion. In such a case, the size of the depression 1304 relative to the enlarged portion defines a rim width 1306.

Figure 15:
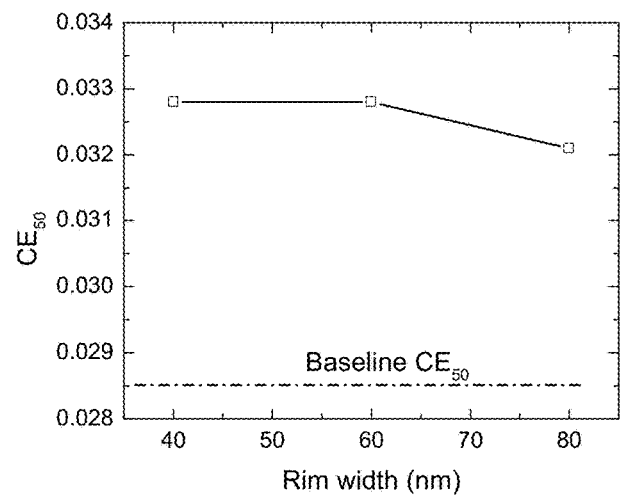
FIG. 15 is graph of efficiency of the near-field transducer of FIGS. 13 and 14.

The depression 1304 assists in reducing the spread in the TM component (i.e., the $E_z$ component) by squeezing the $E_z$ component to the rim 1306 of the NFT at the bottom to enhance the NFT efficiency and reduce the thermal background A graph in FIG. 15 shows the NFT efficiency versus rim width 1306 for a semi-circular gold removal with depth=20 nm. The baseline NFT efficiency $CE_{50}$=0.0286. A 15% improvement in NFT efficiency is obtained. But this does not appear to reduce the magnitude of the thermal tail, but its impact to the recording performance is reduced, due to the greater NFT efficiency.

Figure 16:
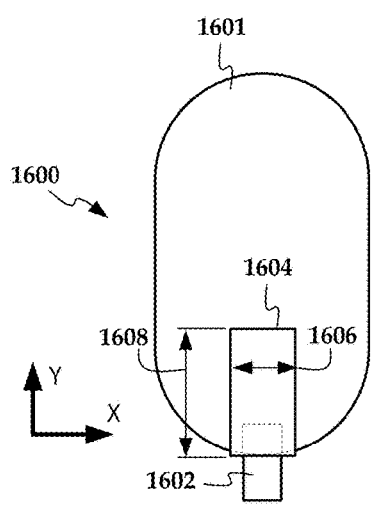
FIGS. 16 and 17 are diagrams showing a configuration of a near-field transducer according to a first embodiment.
Figure 17:
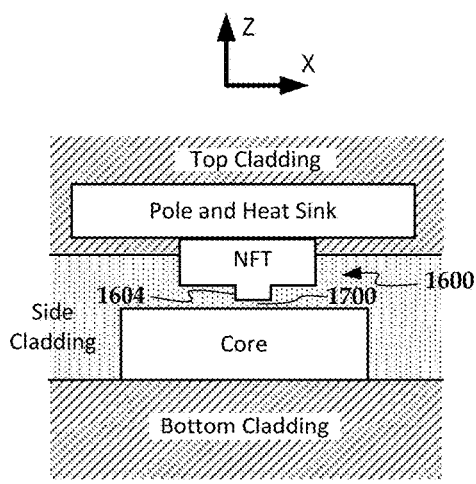
Figure 18:
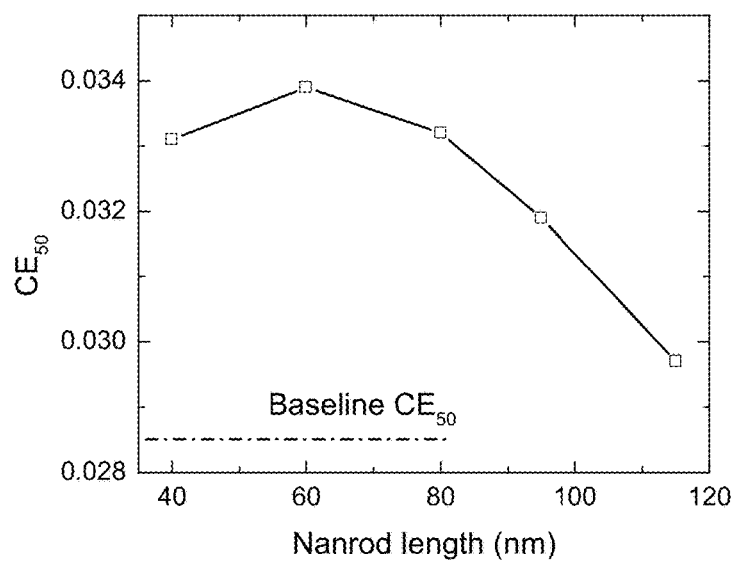
FIG. 18 is graph of efficiency of the near-field transducer of FIGS. 16 and 17.

Diagrams in FIGS. 16 and 17 show configuration of an NFT 1600 according to a second embodiment. A nano-rod 1604 is placed underneath the NFT. The nano-rod 1604 has width 1606 along x direction and length 1608 along y direction. The NFT 1600, side cladding spacer 1700, and the core form a slot waveguide. Lowering the separation between NFT 1600 and core increases the effective mode index. With a nano-rod 1604 attached, it generates a region of higher mode index than its surrounding, and therefore, the TM $E_z$ field is focused, resulting in an increased NFT efficiency. A graph in FIG. 18 shows the NFT efficiency as a function of nano-rod length 1608 along the y-direction.

The nano-rod is 60-nm wide along x direction and 15-nm thick along z direction. The separation from core to nano-rod is 5 nm. A ~20% improvement in NFT efficiency is obtained. This configuration also reduces the thermal tail slightly.

Figure 19:
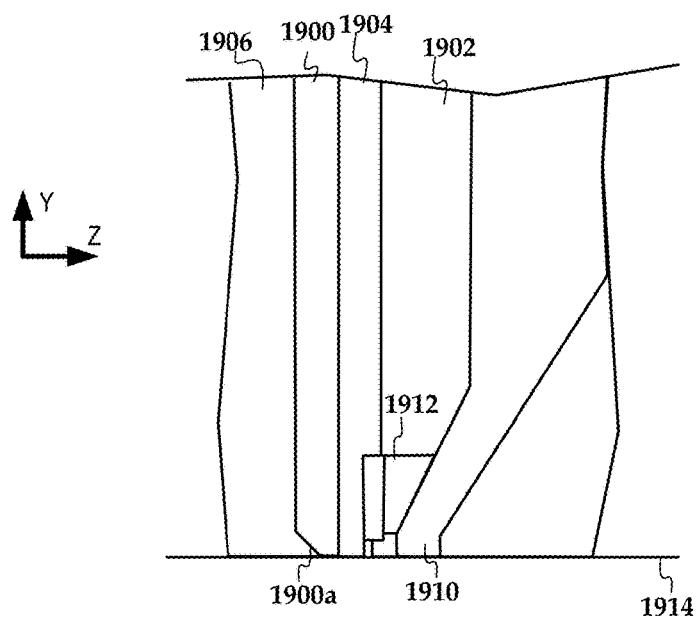
FIG. 19 is a cross-sectional view of a tapered waveguide core according to an example embodiment.

The thermal tail comes from the TM $E_z$ component, generated from $TE_{10}$-TM mode conversion through the NFT. One way to reduce thermal tail with little penalty to NFT efficiency is shown in the read/write head diagram of FIG. 19. A waveguide core 1900 is shown surrounded by bottom cladding layer 1906, side cladding layer 1904, and top cladding layer 1902. An NFT and heat sink 1912 is shown with a write pole 1910 near a media-facing surface 1914. The core 1900 has a tapered end surface 1900a at its terminating end near the media-facing surface 1914. The tapered end surface 1900a is at an angle to the media-facing surface 1914 and faces away from the NFT 1912 and write pole 1910 in a down-track direction (z-direction in this view). The tapered end surface 1900a results in a narrowed down-track dimension of the core 1900a at the media-facing surface 1914.

Figure 20:
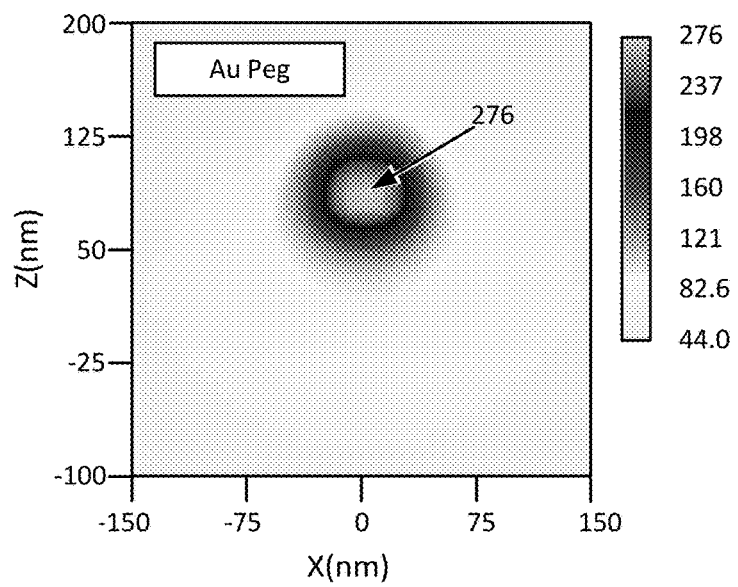
FIGS. 20 and 21 are thermal contour plots of recording media recording layer using a tapered waveguide according to example embodiments.
Figure 21:
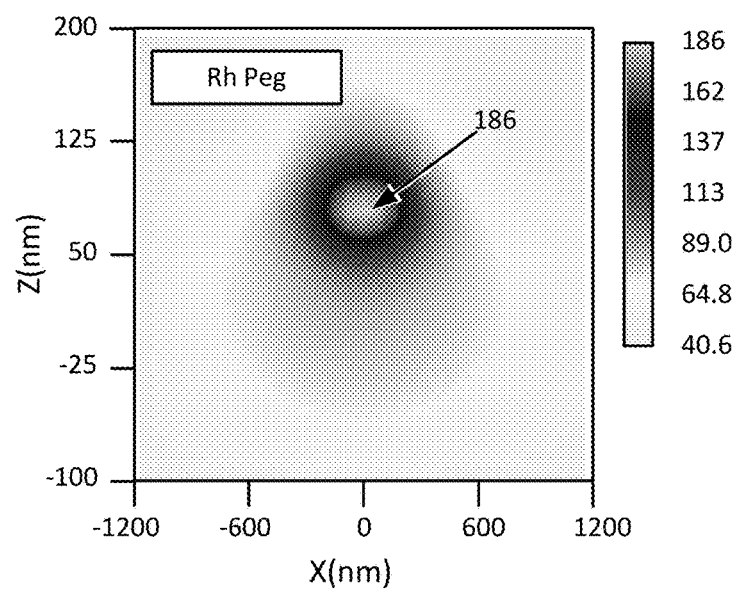

With bottom tapered core, the TM $E_z$ field is reduced, resulted in reduced thermal background in the recording media. Graphs in FIGS. 20 and 21 show results of modeling mid-recording layer temperatures using a waveguide with taper 1900a. The modeling is similar to that used to obtain the results in FIGS. 6 and 7, and assumes the following: core thickness along down-track (z) direction at the media-facing surface=40 nm, and taper slope angle ≈26°. Compared to FIGS. 6 and 7, the thermal background reduction is clearly improved. In particular, for the Rh peg shown in FIGS. 7 and 21, the thermal spot size FWHM along down-track direction is reduced from 129 nm to 101 nm, an improvement of 22%.

Figure 22:
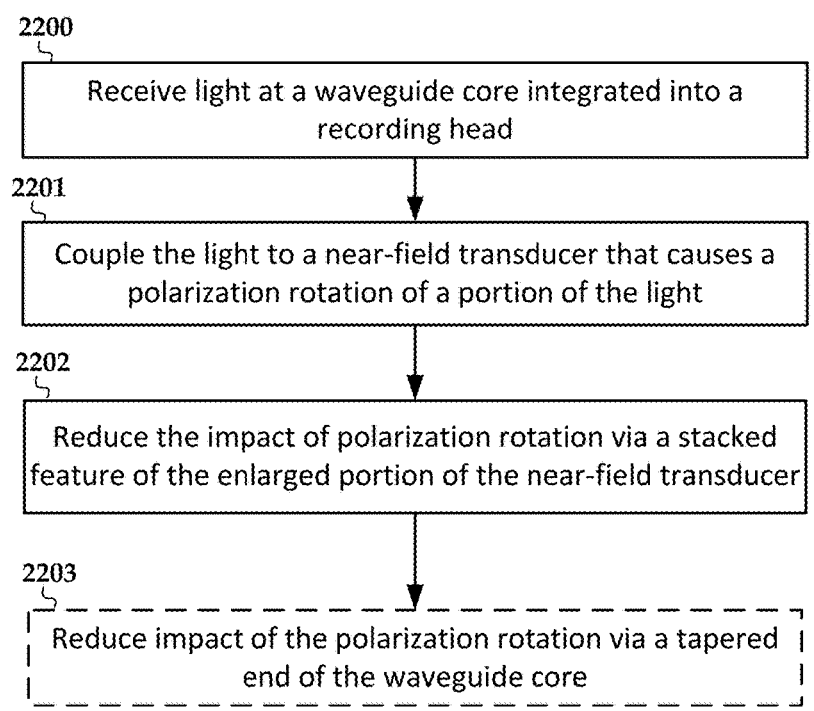
FIG. 22 is a flowchart of a method according to an example embodiment.

In FIG. 22, a flowchart shows a method according to an example embodiment. The method involves receiving 2200 light at a waveguide core integrated into a recording head. The light is coupled 2201 to a near-field transducer that overlaps the waveguide core near a media-facing surface of the recording head. The near-field transducer has an enlarged portion formed of a plasmonic material and a peg formed of a different material than the enlarged portion. The near-field transducer achieves plasmonic resonance in response to the coupling of the light and causes a polarization rotation of a portion of the light. The impact of polarization rotated light on recording performance is reduced 2202 via a stacked feature of the enlarged portion of the near-field transducer by improving the NFT efficiency. Optionally, the emission/impact of polarization rotated light into recording media can be reduced 2203 via a tapered end of the waveguide core. For example, the core may have a tapered end surface facing away from the near-field transducer and at an angle to the media-facing surface between 0 degrees and 90 degrees (e.g., between 10 and 45 degrees) resulting in a narrowed down-track dimension of the waveguide core at the media-facing surface.

In summary, the NFT for $TE_{10}$ mode waveguide induces significant polarization conversion, from $TE_{10}$ mode to TM mode. This TM component is the major cause for thermal background. Embodiments are described to reduce the impact of this TM component that includes the improvement of NFT efficiency and the reduction of its emission into the recording media (e.g., tapered waveguide core) to mitigate thermal background.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a waveguide core that receives light from a light source; and
   a near-field transducer overlapping the core near a media-facing surface of the recording head, the near-field transducer comprising:
      an enlarged portion formed of a layer of plasmonic material disposed on a wafer plane, the enlarged portion comprising a first thickness normal to the wafer plane at an upper part of the enlarged portion, the upper part facing away from the media-facing surface, a major surface of the enlarged portion being parallel to the wafer plane and facing the core;
      a peg extending from a lower part of the enlarged portion, the lower part of the enlarged portion having a depression in the major surface that results in a second thickness of the lower part normal to the wafer plane, the second thickness less than the first thickness, the depression comprising a contour that corresponds to an outer contour of the lower part, the outer contour of the lower part having the first thickness, the depression being filled by a dielectric material of low refractive index.

2. The recording head of claim 1, wherein the enlarged portion comprises a stadium shape.

3. The recording head of claim 1, wherein the near-field transducer achieves resonance in response to being coupled to a first mode of light and generates a second mode that is polarization rotated from the first mode, and wherein the depression squeezes the second mode of the light to the rim of the enlarged portion to enhance an efficiency of the near-field transducer and reduce emission of a thermal background.

4. The recording head of claim 3, wherein the first mode comprises a higher-order, transverse electric ($TE_{10}$) mode and the second mode comprises a transverse magnetic (TM) mode.

5. The recording head of claim 1, wherein the peg is formed of a different material than that of the enlarged portion.

6. The recording head of claim 1, wherein the waveguide core comprises a tapered end surface near media-facing surface, the tapered end surface facing away from the near-field transducer and at an angle to the media-facing surface between 0 degrees and 90 degrees resulting in a narrowed downtrack dimension of the waveguide core at the media-facing surface.

7. The recording head of claim 1, wherein the depression faces away from a write pole of the recording head.

8. A recording head comprising:
   a waveguide core that receives light from a light source; and
   a near-field transducer overlapping the waveguide core near a media-facing surface of the recording head, the near-field transducer, comprising:
      an enlarged portion formed of a plasmonic material;
      a peg extending from a lower edge of the enlarged portion, the peg being formed of a different material than the enlarged portion; and
      a nano-rod separate from the peg and protruding from a side of the enlarged portion that faces the waveguide core, the nano-rod extending from a middle part of the enlarged portion to the lower edge of the enlarged portion, the nano-rod extending away from the media-facing surface less than halfway between the lower edge of the enlarged portion and an upper edge of the enlarged portion facing away from the lower edge.

9. The recording head of claim 8, wherein the enlarged portion comprises a stadium shape.

10. The recording head of claim 8, wherein the near-field transducer achieves resonance in response to being coupled to a first mode of light and generates a second mode that is polarization rotated from the first mode, and wherein the nano-rod condenses the second mode of the light to the middle of the enlarged portion to improve an efficiency of the near-field transducer and reduce emission of a thermal background.

11. The recording head of claim 10, wherein the first mode comprises a higher-order, transverse electric ($TE_{10}$) mode and the second mode comprises a transverse magnetic (TM) mode.

12. The recording head of claim 8, wherein the waveguide core comprises a tapered end surface near media-facing surface, the tapered end surface facing away from the near-field transducer and at an angle to the media-facing surface between 0 degrees and 90 degrees resulting in a narrowed downtrack dimension of the waveguide core at the media-facing surface.

13. The recording head of claim 8, wherein the nano-rod faces away from a write pole of the recording head.

14. A method comprising:
   receiving light at a waveguide core integrated into a recording head;
   coupling the light to a near-field transducer that overlaps the waveguide core near a media-facing surface of the recording head, the near-field transducer comprising an enlarged portion formed of a plasmonic material and a peg formed of a different material than the enlarged portion, the near-field transducer achieving plasmonic resonance in response to the coupling of the light and causing a polarization rotation of a portion of the light from a first mode to a second mode; and
   reducing the emission of the second mode to a recording medium via a stacked feature of the enlarged portion of the near-field transducer, wherein the stacked feature comprises one of:
      a depression in the enlarged portion that results in a reduced thickness of a lower portion of the enlarged portion proximate the peg, the reduced thickness being less than a nominal thickness of the enlarged portion; and a nano-rod on a side of the enlarged portion that faces the waveguide core, the nano-rod extending from a middle part of the enlarged portion to a lower edge of the enlarged portion.

15. The method of claim 14, wherein the depression comprises a contour that corresponds to an outer contour of the lower part, the outer contour having the nominal thickness.

16. The method of claim 14, further comprising reducing the second mode of the light from reaching the recording medium via a tapered end surface of the waveguide core near media-facing surface, the tapered end surface facing away from the near-field transducer and at an angle to the media-facing surface between 0 degrees and 90 degrees resulting in a narrowed downtrack dimension of the waveguide core at the media-facing surface.

17. The method of claim 14, wherein the stacked feature comprises the nano-rod, and wherein reducing the emission of the second mode comprises condensing the second mode of the light to the middle of the enlarged portion.

18. The method of claim 14, wherein the stacked feature comprises the depression, and wherein reducing the emission of the second mode comprises squeezing the second mode of the light to the rim of the enlarged portion.

19. The method of claim 14, wherein reducing the emission of the second mode enhances an efficiency of the near-field transducer and reduces emission of a thermal background.

\* \* \* \* \*